United States Patent
Wagner et al.

(10) Patent No.: US 7,527,655 B1
(45) Date of Patent: May 5, 2009

(54) REACTIVE INK JET INK PRINTING PROCESS

(75) Inventors: Barbara J. Wagner, Mt. Pleasant, SC (US); Ming Xu, Mt. Pleasant, SC (US)

(73) Assignee: Sawgrass Technologies, Inc., Mt. Pleasant, SC (US)

( * ) Notice: Subject to any disclaimer, the term of this patent is extended or adjusted under 35 U.S.C. 154(b) by 0 days.

(21) Appl. No.: 10/172,407

(22) Filed: Jun. 14, 2002

Related U.S. Application Data

(60) Provisional application No. 60/298,788, filed on Jun. 15, 2001.

(51) Int. Cl.
*C09B 62/00* (2006.01)

(52) U.S. Cl. .......... 8/543; 8/467; 8/571; 8/449; 8/115.51; 8/116.1; 8/195; 427/146; 427/148; 427/150

(58) Field of Classification Search ........ 8/445, 8/470, 499, 543, 549, 147, 151, 158, 115.51, 8/116.1, 195, 467, 449, 471; 347/106; 38/144; 428/195, 202; 137/3, 15.18, 15.19, 88, 93, 137/101.25, 111; 427/146, 148, 150
See application file for complete search history.

(56) References Cited

U.S. PATENT DOCUMENTS

| | | | | |
|---|---|---|---|---|
| 4,167,392 A | * | 9/1979 | Defago | 8/471 |
| 4,849,770 A | * | 7/1989 | Koike et al. | 347/100 |
| 5,746,816 A | * | 5/1998 | Xu | 106/31.25 |
| 5,755,862 A | * | 5/1998 | Gregory et al. | 106/31.48 |
| 5,981,045 A | * | 11/1999 | Kuwabara et al. | 428/32.12 |
| 6,183,933 B1 | * | 2/2001 | Ishikawa et al. | 430/256 |
| 6,460,992 B1 | * | 10/2002 | Boyd et al. | 347/106 |
| 6,539,652 B1 | * | 4/2003 | Barry | 38/144 |
| 6,638,604 B1 | * | 10/2003 | Bamberg et al. | 156/240 |
| 6,705,717 B1 | * | 3/2004 | Fujita et al. | 347/106 |

FOREIGN PATENT DOCUMENTS

| | | | |
|---|---|---|---|
| JP | 08-039772 | * | 2/1996 |
| JP | 202998 | * | 8/1998 |

OTHER PUBLICATIONS

Grant and Hackh's Chemical Dictionary, 1987 p. 542.*

* cited by examiner

*Primary Examiner*—Lorna M Douyon
*Assistant Examiner*—Tri V Nguyen
(74) *Attorney, Agent, or Firm*—B. Craig Killough; Ernest B. Lipscomb, III

(57) ABSTRACT

An ink jet printing process in which an image is permanently bound, directly or indirectly, to a final substrate by reaction of the ink with the substrate. An ink jet ink is that is comprised of reactive dyes, direct dyes or combinations thereof are printed according to the process.

12 Claims, No Drawings

REACTIVE INK JET INK PRINTING PROCESS

FIELD OF THE INVENTION

The present invention relates to the process of printing a reactive ink jet ink onto a medium or substrate in a non-activated form for subsequent activation of the reactive ingredients that react with the substrate.

BACKGROUND OF THE INVENTION

Words and designs are frequently printed onto clothing and other textile materials, as well as other objects. Common means of applying such designs to objects include the use of silk screens, and mechanically bonded thermal transfers. The silk screen process is well known in the art, and an example of a mechanical thermal bonding process to textile materials is described in Hare, U.S. Pat. No. 4,224,358.

The use of digital computer technology allows a virtually instantaneous printing of images. For example, video cameras or scanning may be used to capture an image to a computer. The image may then be printed by a computer driven printer, including thermal, ink jet, and laser printers. Computer driven printers are readily available which will print in multiple colors. Heat activated, or sublimation, transfer dye solids change to a gas at about 400° F., and have a high affinity for polyester at the activation temperature. Once the gassification bonding takes place, the ink is permanently printed and highly resistant to change or fading caused by laundry products. While sublimation dyes yield excellent results when a polyester substrate is used, these dyes have a limited affinity for other materials, such as natural fabrics like cotton and wool. Accordingly, images produced by heat activated inks comprising sublimation dyes which are transferred onto textile materials having a cotton component do not yield the high quality images experienced when images formed by such inks are printed onto a polyester substrate. Images which are printed using sublimation dyes applied by heat and pressure onto substrates of cotton or cotton and polyester blends yield relatively poor results.

The natural tendency of the cotton fiber to absorb inks causes the image to lose its resolution and become distorted. Liquid inks other than sublimation inks wick, or are absorbed by cotton or other absorbent substrates, resulting in printed designs of inferior visual quality, since the printed colors are not properly registered on the substrate.

To improve the quality of images transferred onto substrates having a cotton component or other absorbent component, substrates are surface coated with materials such as the coatings described in DeVries, et. al., U.S. Pat. No. 4,021,591. Application of polymer surface coating materials to the substrate allows the surface coating material to bond the ink layer to the substrate, reducing the absorbency of the ink by the cotton and improving the image quality.

Gross coverage of the substrate with the surface coating material does not match the coating with the image to be printed upon it. The surface coating material is applied to the substrate over the general area to which the image layer formed by the inks is to be applied, such as by spraying the material, or applying the material with heat and pressure from manufactured transfer sheets, which are usually rectangular in shape. To achieve full coverage of the surface coating, the area coated with the surface coating material is larger than the area covered by the ink layer. The surface coating extends from the margins of the image after the image is applied to the substrate, which can be seen with the naked eye. The excess surface coating reduces the aesthetic quality of the printed image on the substrate. Further, the surface coating tends to turn yellow with age, which is undesirable on white and other light colored substrates. Yellowing is accelerated with laundering and other exposure to heat, chemicals, or sunlight. A method described in Hale, et. al., U.S. Pat. No. 5,575,877, involves printing the polymer surface coating material to eliminate the margins experienced when aerosol sprays or similar methods are used for gross application of the polymeric coating material.

A process of thermal transfers wherein the ink mechanically bonds to the substrate is described in Hare, U.S. Pat. No. 4,773,953. The resulting mechanical image, as transferred, is a surface bonded image with a raised, plastic like feel to the touch. Thermal transfer paper can transfer an image to a final substrate such as cotton, however, this method has several limitations. First, the entire sheet is transferred, not just the image. Second, such papers are heavily coated with polymeric material to bind the image onto the textile. This material makes the transfer area very stiff and has poor dimensional stability when stretched. Finally, the laundering durability is not improved to acceptable levels. The thermal transfer paper technology (cited Hare patent) only creates a temporary bond between the transfer materials and the final substrate. This bond is not durable to washing.

The use of reactive dyes for printing on cotton and other natural fibers is well known in the art. For example, Gutjahr, et. al. in "Textile Printing", Second Edition, pp. 157-163 and Akerblom, et. al., U.S. Pat. No. 5,196,030 describe methods for the use of reactive dyes in print pastes for direct printing onto cellulosic fabrics using traditional printing techniques, such as silk-screen printing. Mehl, et. al, U.S. Pat. No. 4,664,670 describes the use of a transfer sheet impregnated with a nitrogen-containing compound that is printed by offset, gravure, or other traditional techniques using a sparingly soluble, non-subliming dye and a binder. The image thus produced is then transferred to cellulose or polyamide fibers. Koller, et. al., U.S. Pat. No. 4,097,229 describes the use of anthraquinone-type, sublimable, fiber-reactive disperse dyes that can be applied to a carrier sheet by spraying, coating, or printing, by such methods as flexogravure, silk-screen, or relief printing, and subsequently heat transferred to cellulose or polyamide fabrics. None of these processes are printed digitally and require pre- and post-treatments.

Digital printing processes using reactive dyes are known. For example, Yamamoto, et. al, U.S. Pat. No. 5,250,121 describes the use of a monochlorotriazine and/or vinyl sulfone reactive dye in an aqueous ink jet ink for printing directly onto pretreated cellulosic fabric. Von der Eltz, et. al., U.S. Pat. No. 5,542,972 describes the use of an aqueous formulation including a reactive dye whose reactive group contains a cyanamide group and an alkaline agent. The inks are used to print onto paper as a final substrate.

Melt transfer printing has been used since the nineteenth century to transfer embroidery designs to fabric. A design is printed on paper using a waxy ink, then transferred with heat and pressure to a final substrate. The Star process, developed by Star Stampa Artistici di Milano, uses a paper that is coated with waxes and dispersing agents. The design is printed onto the coated paper by gravure printing using an oil and wax based ink. The print is then transferred to fabric by pressing the composite between heated calender rollers at high pressure. The ink melts onto the final substrate carrying the coloring materials with it. Fabrics printed in such a method using direct dyes are then nip-padded with a salt solution and steamed. Vat dyes can also be used in the ink, but the fabric must be impregnated with sodium hydroxide and hydros solution and steamed. The residual waxes from the transfer ink are removed during washing of the fabric.

SUMMARY OF THE INVENTION

This invention is a digital printing process in which an image is permanently bound, directly or indirectly, to a final substrate by reaction of the ink with the substrate. More specifically, this invention is a process of inkjet printing, such as thermal, piezo or phase change, continuous or drop-on-demand, in which the colorant material is composed of reactive dyes, direct dyes or combinations of such and may be combined with disperse dyes.

DESCRIPTION OF THE PREFERRED EMBODIMENT

An alkaline or alkaline-producing substance is printed either simultaneously with or before or after the colorant-containing component in a separate chamber from the colorant material, or may be combined with the colorant material in the same printing chamber. The ink may contain one or more optional energy-activated printing additives, such as urea, antiaggregates, such as 1-methyl-2-pyrrolidinone, and/or wetting agents, such as nonionic or ionic surfactants. Permanently bonded color images are provided by the reaction between the dye and the final substrate, which may be cellulosic, protein or polyamide fiber material, or mixtures with polyester, but not until activation of the printed ink image.

To prevent premature or undesired reaction, the ink is printed in a non-activated state. The ink is then activated such as by the application of energy and/or pressure to form a permanent bond between the colorant and the final substrate. Permanently bonded color images are then provided by the reaction between the reactive dye, and/or direct dye and/or disperse dye and the final substrate, which may be any cellulosic, protein or polyamide fiber material, or mixtures with polyester. In certain embodiments of the invention, the reactive components in the ink, such as the dyestuff, are protected from premature reaction by a physical barrier prior to reaction with the final substrate. This physical barrier may be provided by encapsulation of the reactive components as part of the ink preparation process. Upon the application of energy and/or pressure, the walls of the so encapsulated reactive components rupture allowing contact between the reactive components of the ink and other components of the ink and the final substrate.

The ink may comprise a solvent for the dyes that liquefies upon the application of heat during transfer or activation. The solvent is an energy activated printing additive. The solvent is dissolved into the carrier for the ink jet ink, which may be water. The solvent solidifies after the ink is printed and the carrier and any other liquids evaporate. The solvent melts and liquefies upon the application of heat during transfer or activation. The solvent facilitates the dye-fiber reaction, and aids in the fixation of the dye to the fiber material. Typical heat transfer or heat activation temperatures are in the range 175-215° C. Examples of heat-activated printing additives include, but are not limited to, substituted and unsubstituted ureas, such as urea, 1,1-dimethylurea, 1,3-dimethylurea, and ethylurea; imines, such as polyethylene imines; amides, such as anthranilamide; imides, such as N-hydroxysuccinimide; substituted or unsubstituted 5- to 7-membered saturated or unsaturated heterocyclic ring structures that possess at least one of the atoms or groups O, S, N, NH, CO, CH=, or $CH_2$ as ring members, such as caprolactam, imidazole, 2-methylimidazole, isonicotimamide, and 5,5-dimethylhydantoin, resorcinol, 2-methylresorcinol, and succinic anhydride. The heat-activated printing additive is added to the ink formulation in an amount of 0-50%, preferably 2-25%.

The ink jet ink may contain an alkaline material that may be placed in solution or dispersed in the carrier. Examples of alkaline substances used in the present invention include alkali metal hydroxides, such as potassium hydroxide and sodium hydroxide; alkali metal carbonates and bicarbonates, such as sodium carbonate and sodium bicarbonate; amines, such as mono-, di-, and triethanolamines; compounds which form alkaline substances upon application of steam, such as sodium trichloroacetate. Preferred alkaline substances are sodium carbonate and sodium bicarbonate. Also preferred is the use of sodium triacetate, which decomposes to give sodium carbonate upon application of steam, and therefore a neutral printing ink may be used.

The carrier material may be ketones, esters, alcohols, glycol ethers, glycol ether esters and aromatic hydrocarbons. The carrier may also be water. The ink may be water soluble or reducible, a colloidal ink dispersion, or an aqueous dispersion or emulsion. A combination of carriers may be used.

The energy source used to activate the inks may be heat, radiation, such as ultrasonic or other vibrational radiation. When heat is the energy source used to activate the inks, temperatures in the range of 60° C. to 220° C. are typically employed. A temperature range of 150° C. to 210° C. is preferred.

A digital printer may print an image onto an intermediate media, which may be paper, at a relatively low temperature, so that the ink is not activated during the process of printing onto the medium. The image formed by the printed ink is transferred from the intermediate medium to a final substrate on which the image is to permanently appear, by the application of energy such as in the form of heat and/or pressure which activates the ink. Alternatively, the image may be printed directly onto the final substrate, such as cotton. The image is then permanently bonded to the substrate by the application of energy and/or pressure.

Most printing processes require pre- and/or post-processing steps. In this invention it is not necessary to pretreat the fabric to be printed in any special way as the process used contains all the ingredients necessary for fixing the image permanently to the fabric. Post-processing is also not required, the reactive ingredients being used in such a combination as to promote essentially complete reaction of the dyestuff with the fiber material. Dyestuffs are chosen such that reactivity towards the functional groups of the fibers is higher than that of, for example, hydrolysis. One advantage of digital printing is that the amounts of ingredients can be precisely controlled to be stoichiometric, thus eliminating the need for post-processing. In this invention, only the amount of dye needed to provide a vivid image upon (transfer) is used and not an excess.

Bonding of the color images of the present invention is provided by the reaction between the reactive dye and the final substrate when the final substrate is a cellulosic, protein or polyamide fiber. The substrate may be a textile, in particular, composed primarily of natural fibers, such as cellulosic and/or polyamide fibers, either woven or non-woven and dyeable with reactive and/or direct dyes.

A reactive dye is defined as a colorant that is capable of forming a covalent bond between a carbon or phosphorus atom of the dye ion oor molecule and an oxygen, sulfur or nitrogen atom of a hydroxy, mercapto or amino group, respectively, of the final substrate. The reactive dye can form a chemical bond with the hydroxy group in cellulose fibers, such as cotton, linen, viscose or Lyocell; with the mercapto or amino groups in polypeptide chains of protein fibers, such as wool and silk; or with the amino groups in polyamide fibers, such as Nylon 6.6 and Nylon 6.

The reactive dye may contain a water-solubilizing group, such as sulfonic acid or carboxylic acid. Examples of reactive dyes include, but are not limited to, those that contain one or more of the following functional groups: monohalogentriazine, dihalogentriazine, 4,5-dichloropyridazone, 1,4-dichlorophthalazine, 2,4,5-trihalogenpyrimidine, 2,3-dichloroquinoxaline, 3,6-dichloropyridazone, sulfuric acid ester of β-hydroxyethylsulfone, N-substituted β-aminoethylsulfone, epoxy group and precursor 2-chloro-1-hydroxyethyl, sulfuric acid ester of β-hydroxypropionamide, α,β-dibromopropionamide, phosphonic acid and phosphoric acid ester. Specific examples are, for example, those under the trade names Procion H, Procion MX, Primazin P, Reatex, Cibacron T, Levafix E, Solidazol, Remazol, Hostalan, Procinyl, Lanasol, Procion T, respectively. Preferred are those containing the monohalogentriazine.

Included in the class of reactive dyes are reactive disperse dyes. These dyes also react with the hydroxy group on cellulose or the amino group of polyamides to form a covalent bond. Reactive disperse dyes, however, do not contain solubilizing groups and are therefore insoluble, or sparingly soluble in water or other solvents. The reactive disperse dyes are typically sublimable.

When the final substrate is a blend of cellulosic, protein, or polyamide fiber with polyester fiber a combination of reactive and disperse dyes may be used. Disperse dyes are relatively low in molecular weight and contain minimal active functional groups. Such dyes are substantially insoluble in water or organic solvents. Examples of disperse dyes include, but are not limited to, those of the following classes: azo, anthraquinone, coumarin and quinoline. Pre-mixed reactive/disperse dye combinations are also commercially available. Examples are Drimafon R, Procilene, Remaron Printing Dyes and Teracron.

Direct dyes, which are held fast on the fiber surface by van der Waals forces and hydrogen-bonding, may be used in the present invention. Examples of direct dyes are Carodirect Yellow RL (Direct Yellow 86), ACDI Turquoise FBL (Direct Blue 199), Intrabond Liquid Turquoise GLL (Direct Blue 86), Dyrite Red 5BL (Direct Red 81) and Doramin Black AR (Direct Black 22).

Example 1

|  | Weight Percent |
| --- | --- |
| Colored Ink | |
| Colorant | 1-20 |
| Heat-activated printing additive | 1-30 |
| Antiaggregate | 0.1-5 |
| Wetting agent | 0-5 |
| Carrier | 10-90 |
| Alkaline Ink | |
| Alkaline substance | 0.5-10 |
| Wetting agent | 0-5 |
| Carrier | 85-95 |

What is claimed is:

1. A method of printing using an ink jet printer consisting of:
    a. preparing an ink jet ink comprising:
        (1) at least one reactive dye that is capable of forming a covalent bond with a printable substrate,
        (2) a liquid carrier, wherein said liquid carrier is selected from the group consisting of water, ketones, esters, alcohols, glycol ethers, glycol ether esters and aromatic hydrocarbons;
        (3) an energy activated printing additive that is solubilized in said ink jet ink wherein said energy activated printing additive is a selected from the group consisting of substituted and unsubstituted ureas and;
    b. supplying an ink jet printer with said ink jet ink;
    c. printing said ink jet ink using said jet printer and forming an image on a printable substrate, wherein said energy activated printing additive solidifies upon evaporation of said liquid carrier;
    d. transferring said image to a final substrate by the application of heat to said image at a temperature between about 175° C. and about 212° C.,
whereupon said energy activated printing additive liquefies by the application of said heat to said image, and said reactive dye is solubilized in said energy activated printing additive, and said energy activated printing additive, in a liquid form, facilitates transfer of said image from said printable substrate to said final substrate, and said reactive dye reacts with said final substrate and thereby bonds to said final substrate to form said image on said final substrate.

2. The method of printing using an ink jet according to claim 1, wherein said final substrate comprises an hydroxyl group, and wherein said hydroxyl group reacts with said reactive dye.

3. The method of printing according to claim 1, wherein said final substrate comprises cellulose, and wherein said cellulose reacts with said reactive dye.

4. The method of printing according to claim 1, wherein said ink jet ink comprises an amino group.

5. The method of printing according to claim 2, wherein said ink jet ink comprises an amino group, and said amino group reacts with said hydroxyl group.

6. The method of printing according to claim 1 wherein said at least one reactive dye contains at least one of the following functional groups: monohalogentriazine, dihalogentriazine, 4,5-dicholopyridazone, 1,4-dichloropyridalazine, 2,4,5-trialogenpyrimidine, 2,3-dichloroquinixaline, 3,6-dichloropyridazone, sulfuric acid ester of β-hydroxyethylsulfome, N-substituted β-aminoethylsulfone, epoxy group and precursor 2-chlor-1-hydroxyethyl, sulfuric acid ester of β-hydroxypropionamide, α,β-dibromopropionamide, phosphonic acid and phosphoric acid ester.

7. The method of printing according to claim 1 wherein said at least one reactive dye contains the monohalogentriazine as a functional group.

8. The method of printing according to claim 1 wherein said liquid carrier is selected from the group consisting of water, ketones, esters, alcohols, glycol ethers, glycol ether esters and aromatic hydrocarbons.

9. The method of printing according to claim 1 wherein said ink jet ink further comprises an alkaline material.

10. The method of printing according to claim 1 wherein said energy activated printing additive is a selected from the group consisting of urea, 1-1-dimethylurea, 1,3-dimethylurea, and ethylurea.

11. The method of printing according to claim 1 wherein said energy activated printing additive is present in an amount of from about 2% to about 25% by weight of said ink jet ink.

12. The method of printing according to claim 1 wherein said final substrate a member of the group consisting of cellulosic, protein or polyamide fiber material.

* * * * *